(12) United States Patent
Suzuki et al.

(10) Patent No.: US 6,321,890 B1
(45) Date of Patent: Nov. 27, 2001

(54) VIBRATION REDUCING SYSTEM FOR AUTOMOTIVE VEHICLE

(75) Inventors: Yasuhiro Suzuki; Seiji Ishizu; Kouji Anzai, all of Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/180,610

(22) PCT Filed: Mar. 16, 1998

(86) PCT No.: PCT/JP98/01090

§ 371 Date: Nov. 12, 1998

§ 102(e) Date: Nov. 12, 1998

(87) PCT Pub. No.: WO98/42528

PCT Pub. Date: Oct. 1, 1998

(30) Foreign Application Priority Data

Mar. 25, 1997 (JP) ................................................ 9-072342

(51) Int. Cl.[7] .................................................... F60B 30/06
(52) U.S. Cl. .................... 188/379; 188/380; 267/141.2
(58) Field of Search ............... 267/140.12, 141.2–141.7, 267/293, 294, 292; 188/378, 379, 380; 180/312

(56) References Cited

U.S. PATENT DOCUMENTS

| | | |
|---|---|---|
| 4,381,043 | 4/1983 | Fukushima . |
| 4,406,344 * | 9/1983 | Fukushima ............................ 188/379 |
| 4,456,213 | 6/1984 | Fukushima et al. . |
| 5,052,530 * | 10/1991 | Shimazaki ............................ 188/379 |
| 5,156,380 * | 10/1992 | Cerruti et al. ....................... 267/293 |

FOREIGN PATENT DOCUMENTS 26 32 574  1/1978 (DE) .
9-263143  10/1997 (JP) .

* cited by examiner

*Primary Examiner*—Matthew C. Graham
(74) *Attorney, Agent, or Firm*—McDermott, Will & Emery

(57) ABSTRACT

In a vibration reducing system, an insulator is disposed between the engine and a vehicle body. A vibration damper such as a dynamic damper is secured to the insulator at a side which is distal from the power unit (viz., an engine and/or transmission/transaxle) and connected to an outboard end of a pin which extends away from the engine. The installation of the vibration damper minimizes the amount of space required and is effective to reduce the vibration and the noise even when the mass of the components is small since the device is disposed at a location where the amplitude of the vibration tends to maximize.

15 Claims, 5 Drawing Sheets

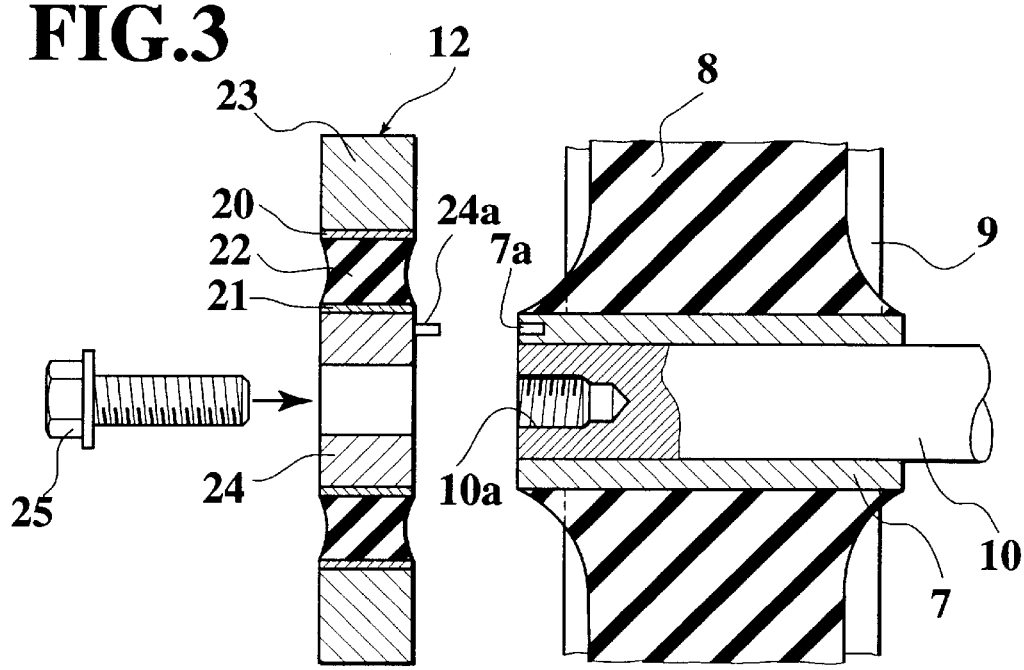
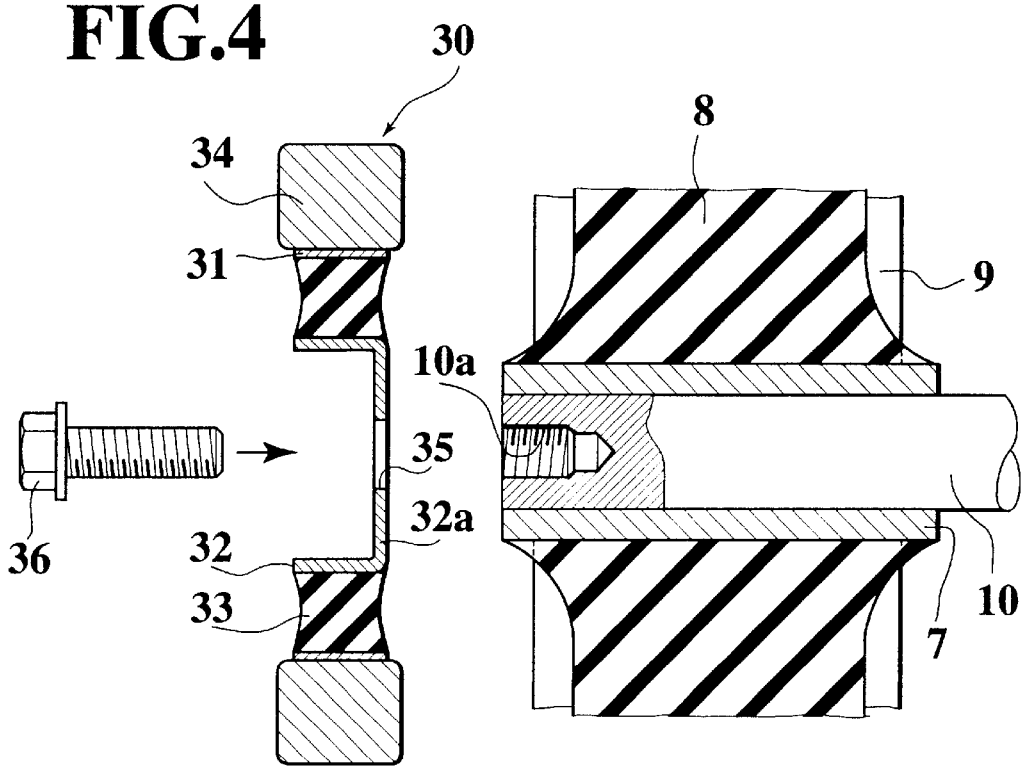

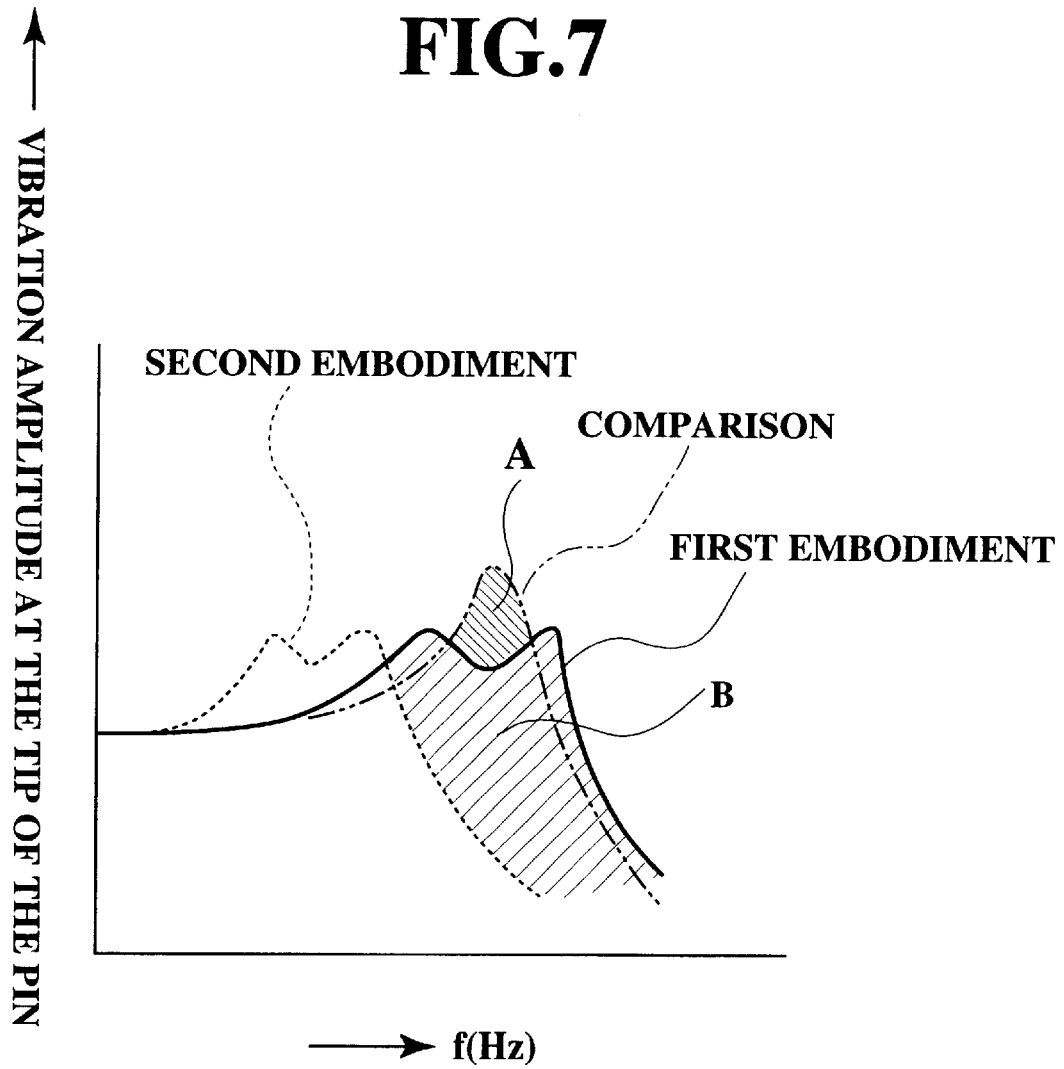

VIBRATION REDUCING SYSTEM FOR AUTOMOTIVE VEHICLE

TECHNICAL FIELD

The present invention relates to a vibration reducing system for automotive vehicles. More specifically, the present invention relates to a vibration reducing system which is disposed between an engine and a vehicle body, and which is adapted to reduce noise and vibration transmitted from the engine to the vehicle body.

BACKGROUND ART

In Japanese Non examined Patent Publication (Tokkai) No. 9-240292 there is disclosed a device for reducing noise and vibration generated by an engine. This related art includes an insulator disposed between an engine and a vehicle body which reduces the noise and vibration transmitted from the engine to the vehicle body.

When installing a vibration damper such as a dynamic damper or a mass damper in the above type of vibration reducing system, there can be obtained a further reduction of the noise and vibration by use of a relatively large space for installation of the vibration damper to the vibration reducing system. However, the degree of difficulty of installing the dynamic damper on the vibration reducing device is increased because of the crowded engine compartment and the limited space in and around the engine.

DISCLOSURE OF INVENTION

It is an object of the present invention to provide a vibration reducing system for an automotive vehicle which facilitates installation of the vibration damper to the vibration reducing system.

It is another object of the present invention to provide a vibration reducing system for an automotive vehicle which minimizes the space required for installation of the vibration damper.

A further object of the present invention to provide a vibration reducing system for an automotive vehicle which will reduce the vibration and the associated noise, even if the mass of the vibration damper is relatively small.

In brief, the above objects are achieved by an arrangement wherein, in order to facilitate installation of the vibration damper to the vibration reducing device, the arrangement comprises a vibration damper secured to a side of the insulator which is distal from engine.

More specifically, an aspect of the invention resides in a vibration reducing system for automotive vehicles comprising: an attachment part connected to a power unit; an insulator having a first inner cylinder, a first elastic member which is connected to an outer surface of the first inner cylinder, and a first outer cylinder which is connected to an outer surface of the first elastic member, and connected to a vehicle body; a connection part having a pin which is fitted into the first inner cylinder, and connected to the attachment part; and a vibration damper secured to said insulator at a side which is distal from the power unit.

BRIEF DESCRIPTION OF DRAWINGS

The various objects and features of this invention will become more clearly understood from the following description taken in conjunction with the appended drawings in which:

FIG. 3 is a sectional view which shows a vibration damper secured to an insulator in accordance with a first embodiment of this invention;

FIG. 4 is a sectional view which shows a vibration damper secured to an insulator in accordance with a second embodiment of this invention;

FIG. 7 is a graph which compares the amplitude frequency relation of the vibration at the tip of a pin which forms part of the present invention, for two embodiments and a control.

BEST MODE FOR CARRYING OUT THE INVENTION

Figure 1:
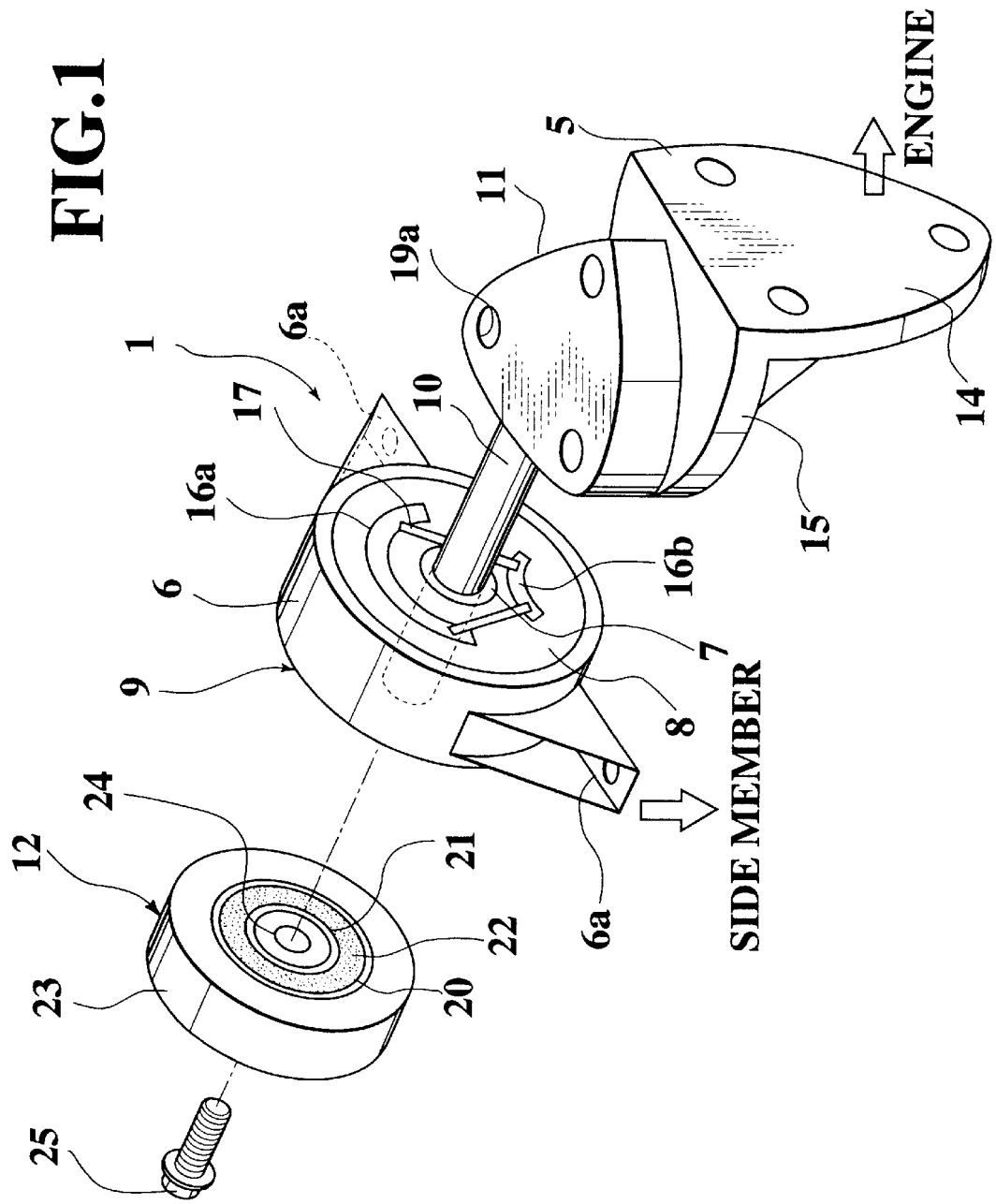
FIG. 1 is an exploded perspective view of a vibration reducing system including a vibration damper according to a first embodiment of this invention.
Figure 2:
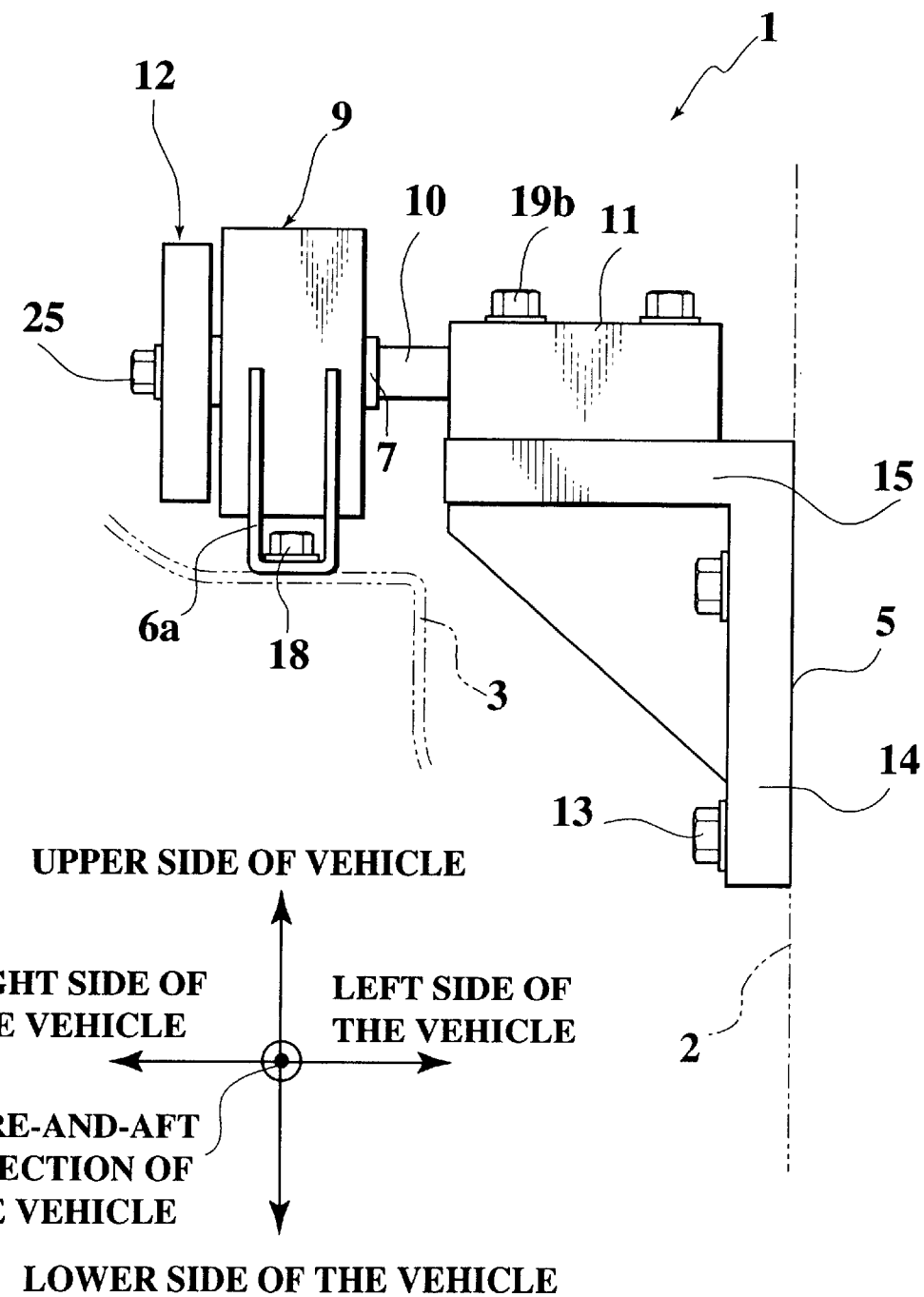
FIG. 2 is a front view of the vibration reducing device shown in FIG. 1.

Referring to the attached drawings, FIGS. 1 and 2 show a vibration reducing system, which in this instance, merely by way of example, relates to a vibration reducing system which is provided between the power unit that is mounted on the vehicle body in a manner wherein it is disposed on an engine on the right side of the vehicle, and oriented in a lateral direction with respect to a side member of the vehicle.

The reference numeral 1 denotes a vibration reducing system disposed between an engine 2 of a power unit and side member 3 of a vehicle body. The vibration reducing system 1 provides an attachment part 5 which is secured to the engine 2, an insulator 9 which includes a first elastic member 8 disposed between a first outer cylinder 6 and a first inner cylinder 7 and which is secured to the side member 3, a connection part 11 which includes a pin 10 fitted into an inner surface of the first inner cylinder 7, and a dynamic damper 12 connected to the insulator 9 at a side which is distal from engine 2.

The attachment part 5 includes a base plate 14 connected to the right side of the engine 2 in a lateral direction by a bolt 13, and a pedestal 15 which horizontally extends to the right of the vehicle in a lateral direction from an upper end of the base plate 14. An upper surface of the pedestal 15 is a flat surface. Plural bolt holes (not shown), for securing the connection part 11 to the pedestal 15, are formed in this upper surface.

The insulator 9 includes the first outer cylinder 6, and a first inner cylinder 7 which is coaxially disposed in the first outer cylinder 6. Both ends of the first inner cylinder 7 project out beyond the respective limits of the first outer cylinder 6. The first elastic member 8 is bonded between an outer surface of the first inner cylinder 7 and an inner surface of the first outer cylinder 6. Arc shaped hollows or openings 16a, 16b are formed at an upper lower side of the first inner cylinder 7. Plate masses 17 are disposed in the elastomeric member so as to extend between the hollows or openings 16a, 16b in the manner illustrated in FIG. 1. Therefore, it is possible to make the first elastic member 8 stronger in longitudinal direction than in a vertical direction, which reduces resonance frequency of the vibration of the vehicle.

A flange 6a for securing the insulator 9 to the side member 3 is connected to both sides of an under part of the first outer cylinder 6. The flange 6a is secured to the side member 3 by bolts 18. The insulator 9 is disposed to the right side of the pedestal 15 and oriented so that its axis extends in a lateral direction of the vehicle.

The connection part 11, which is formed so as to have a triangular shape as seen in plan view, is secured to an upper surface of the pedestal 15 with one side facing to the side member 3. Plural bolt holes 19a are formed in the connection part 11 corresponding to the above mentioned the bolt hole of the pedestal 15, the connection part 11 is secured to the pedestal 15 by screwing bolts 19b, which are inserted into the bolt holes 19a, and the bolt holes of the pedestal 15.

A pin 10 formed at center of a surface facing the side member 3, extends to the insulator 9 in a lateral direction. The pin 10, whose diameter is a little larger than an inner diameter of the first inner cylinder 7 of the insulator 9, is force fitted into the first inner cylinder 7. Then, with a tip of the pin 10 being almost flush with an edge of the first inner cylinder 7 which is distal from the engine 2, the dynamic damper 12 is coaxially connected to the tip of the pin 10.

Referring to FIG. 3, the dynamic damper 12 has a second inner cylinder 21, a second elastic member 22 which is bonded to an outer surface of the second inner cylinder 21, a second outer cylinder 20 which is bonded to an outer surface of the second elastic member 22, and a mass 23 which is fitted on an outer surface of the second outer cylinder 20. A boss 24, which defines another mass, which is of a cylindrical shape and which has a coaxial bore, is disposed within the second inner cylinder 21. The boss 24 has a projection 24a which fits into a small diameter pit or bore 7a formed in an end surface of the first inner cylinder 7 which faces away from the engine 2, for preventing rotation of the dynamic damper 12.

The dynamic damper 12 is coaxially secured to the outboard tip of the pin 10 by fitting the projection 24a of the boss 24 into the pit 7a and thus connects coaxial end surfaces of the boss 24 and the first inner cylinder 7 together. This is followed by disposing a bolt 25 through the bore of the boss 24 and screwing a bolt 25 into the threaded hole 10a, which is formed at the tip of the pin 10.

In this embodiment, relative vibration between the engine 2 and side member 3 is absorbed by the first elastic member 8 of the insulator 9 and dynamic damper 12, so that transmission of engine noise under acceleration and deceleration is reduced. Further, since the dynamic damper 12 is located on the side of the insulator 9 which is distal from the engine 2, the dynamic damper 12 is located in a position where the amplitude of the vibration tends to maximize, and it is accordingly possible to make the dynamic damper 12 perform more efficiently.

The boss 24, which is fitted on the inner surface of the second inner cylinder 21, functions as a mass damper, and is located in a position wherein it is possible to obtain adequate vibration and noise reduction even though the mass 23 is small. Further, the relatively small size of the boss 24 enables the dynamic damper 12 to be connected to the insulator 9 in a manner which renders the arrangement compact and allows for a saving in space.

Through the dynamic damper 12 being secured to the insulator 9 at a side which is distal from the engine 2 and having few attachment limitations, it is possible to facilitate the assembly of the dynamic damper 12 to the insulator 9 and to augment design flexibility. It is also possible to minimize the space necessary for installing the dynamic damper 12 to the insulator 9.

Further embodiments of this invention will be described with reference to FIGS. 4 to 6. In the description of these embodiments, like parts described in the above embodiment, are denoted by like reference numerals or characters.

An embodiment shown in FIG. 4 indicates that a dynamic damper 30 is secured to the tip of the pin 10 by a bolt. The dynamic damper 30 has a second inner cylinder 32, a second elastic member 33 which is bonded on an outer surface of the second inner cylinder 32, a second outer cylinder 31 which is bonded on an outer surface of the second elastic member 33, and a mass 34 which is fitted on an outer surface of the second outer cylinder 31. The second inner cylinder 32 has a securing part 32a on the side of the second inner cylinder facing the pin 10. The securing part 32a has a bolt hole 35 at its center. The dynamic damper 30 is coaxially secured to the tip of the pin 10 by disposing the securing part 32a of the second inner cylinder 32 coaxially against the first inner cylinder 7, and then screwing a bolt 36 into the threaded hole 10a which is formed at the tip of the pin 10 via the bolt hole 35 of the securing part 32a. In this embodiment, it is possible to obtain the same merits as the embodiment shown in FIG. 3 except for the mass damper effect provided by the boss 24 shown in FIG. 3.

Figure 5:
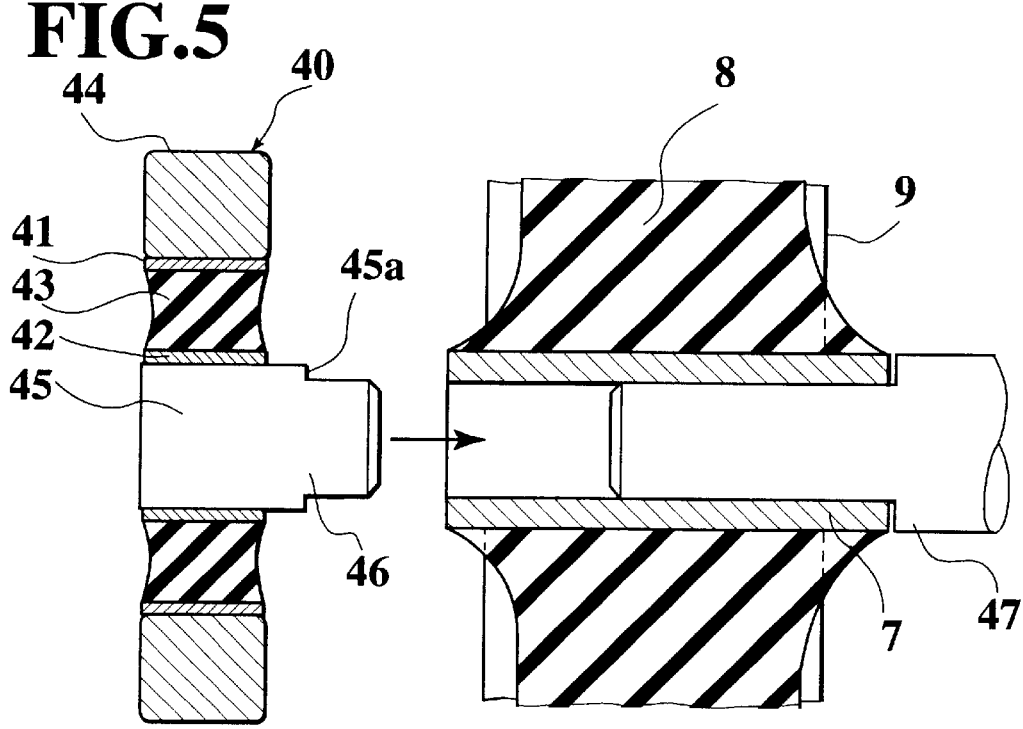
FIG. 5 is a sectional view which shows a vibration damper secured to an insulator in accordance with a third embodiment of this invention.

The embodiment shown in FIG. 5 features a dynamic damper 40 secured to a side of the first inner cylinder 7 of the insulator 9 which is distal from the engine 2, by way of a force fitting technique. In this case, the dynamic damper 40 has a second inner cylinder 42, a second elastic member 43 which is bonded on an outer surface of the second inner cylinder 42, a second outer cylinder 41 which is bonded on an outer surface of the second elastic member 43, and a mass 44 which is fitted onto an outer surface of the second outer cylinder 41. Additionally, a column shaped mass 45, whose diameter is approximately the same as the diameter of the first inner cylinder 7 of the insulator 9, is force fitted into an inner surface of the second inner cylinder 42. The mass 45 has a small diameter part 46 which protrudes from an edge of the second inner cylinder 42 at an end facing a tip of pin 47. This small diameter part has a diameter which is a little larger than an inner diameter of the first inner cylinder 7 of the insulator 9.

The tip of the pin 47 is shortened on the engine 2 side at least by the length of the small diameter part 46. The dynamic damper 40 is coaxially connected to an end of the first inner cylinder 7 which is distal from the engine 2 by fitting the small diameter part 46 into the first inner cylinder 7. Then, a shoulder 45a, which is formed between an outer diameter of the mass 45 and the small diameter part 46, is caused to abut the edge of the first inner cylinder 7 which is distal from the engine 2.

In this embodiment, the mass 45 functions as a mass damper in the same manner as mass 24 shown in FIG. 3, and it is possible to obtain that same meritorious effect as the embodiment shown in FIG. 3. Additionally, it is possible to facilitate attachment of the dynamic damper 40 to the insulator 9 by attachment techniques other than attachment by bolt.

Figure 6:
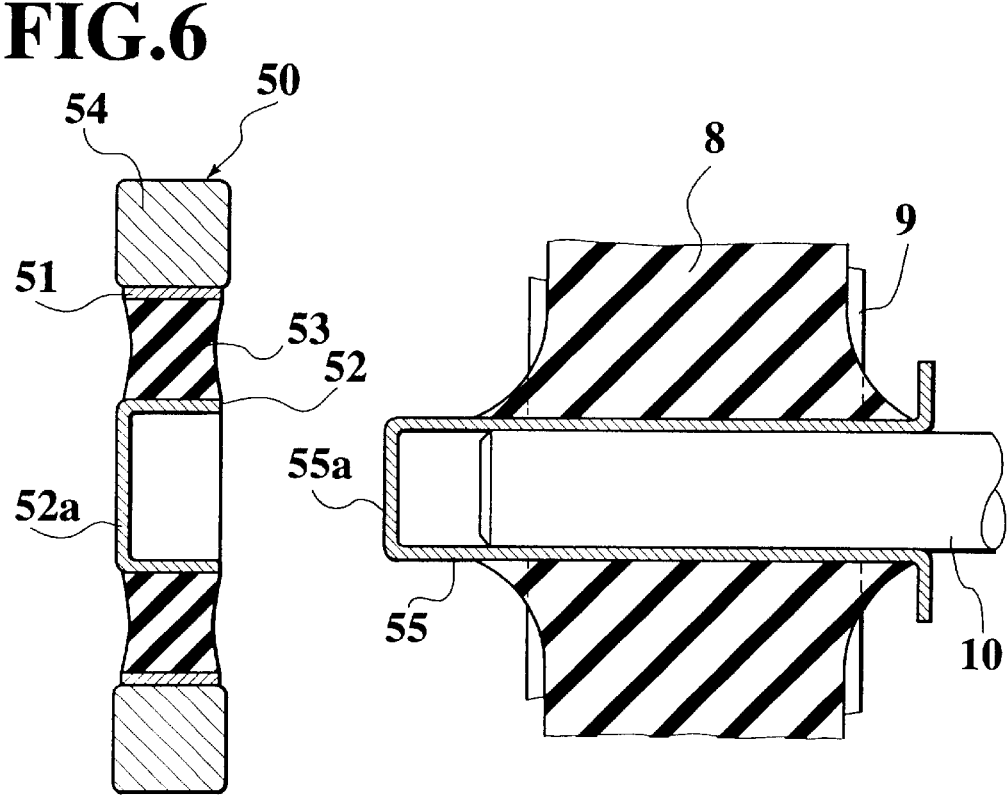
FIG. 6 is a sectional view which shows a vibration damper secured to an insulator in accordance with a fourth embodiment of this invention.

Another embodiment shown in FIG. 6 features the dynamic damper 50 being secured to the first inner cylinder 55 of the insulator 9 at a side which is distal from the engine 2 using a fitting technique.

In this arrangement, the dynamic damper 50 has a second inner cylinder 52, a second elastic member 53 which is bonded on an outer surface of the second inner cylinder 52, a second outer cylinder 51 which is bonded on an outer surface of the second elastic member 53, and a mass 54 which is fitted on an outer surface of the second outer cylinder 51. The second inner cylinder 52 has a cap-like configuration with a bottom plate 52a. The inner diameter of this cap-like inner cylinder 52 is a little smaller than an outer diameter of the first inner cylinder 55 of the insulator 9.

An end of the first inner cylinder 55 which faces away from the engine 2, protrudes toward the dynamic damper 50 past the tip of the pin 10, and has a bottom plate 55a. The bottom plate 55a of the first inner cylinder 55 is formed to correspond to the bottom plate 52a of the second inner cylinder 52.

The dynamic damper 50 is coaxially secured to an end of the first inner cylinder 55, which is distal from the engine 2, by fitting the second inner cylinder 52 onto the outer surface of the first inner cylinder 55 until the bottom plate 52a abuts against the bottom plate 55a.

In this embodiment, it is possible to obtain the same merits as with the embodiment shown in FIG. 3 except for the mass damper effect. Additionally, it is possible to facilitate attachment of the dynamic damper 50 to the insulator 9 through an attachment technique other than attachment by bolt.

FIG. 7 shows the amplitude frequency characteristics of the vibration which occurs at the tip of the pin 10. In FIG. 7, characteristics are derived using the first embodiment which is equipped with the dynamic damper 30 having the structure shown in FIG. 4, and is indicated by the trace denoted by "first embodiment", while the characteristic trace which is derived using the embodiment which is equipped the dynamic damper 12 having the structure shown in FIG. 3, is denoted by "second embodiment". The characteristics of a vibration reducing device which is not equipped with a dynamic damper is provided as a control and labelled "comparison". The data for the first and second embodiments were obtained under the same experimental conditions and differed only in the manner of dynamic damper attachment. The "comparison" is different from the first and second embodiments due to the absence of a dynamic damper.

FIG. 7 shows that the first embodiment has an effect of reducing the vibration amplitude denoted by the hatched portion B as compared with the comparison (denoted by hatched portion A), while the second embodiment, which additionally includes the effect of the mass damper, has an effect of reducing the vibration amplitude which is denoted by the broken line trace.

Although the invention has been described with respect to only a limited number of embodiments, the appended claims are not so limited and should be construed as embodying all modifications and alternative constructions that may occur to one skilled in the art which fairly fall within the basic teaching set forth herein.

For example, the vibration damper is not limited to dynamic dampers, and it is possible to alternatively use a mass damper arrangement in lieu of a dynamic type of arrangement. The rotation preventing device is not limited to the combination of the projection 24a which is formed on the end surface of the boss 24 and the pit 7a which is formed at the end surface of the boss 24 and the pit 7a which is formed at the end surface of the first inner cylinder 7, as it is possible to form the projection on the end surface of the second inner cylinder.

Further, it will be obvious to those skilled in the art alternative means may be used to perform the same function as the elements shown without departing from the scope of the invention.

Industrial Applicability

With the present invention, there is provided a vibration reducing system for an automotive vehicle which facilitates installation of the vibration damper to the vibration reducing system. This vibration reducing system can minimize the space required for installation of the vibration damper. This vibration reducing system can reduce the vibration and the associated noise, even if the mass of the vibration damper is relatively small.

What is claimed is:

1. A vibration reducing system for automotive vehicles comprising:

an attachment part connected to a power unit;

an insulator having a first inner cylinder, a first elastic member which is connected to an outer surface of said first inner cylinder, and a first outer cylinder which is connected to an outer surface of said first elastic member, and being connected to a vehicle body;

a connection part connected to said attachment part at a power unit side, said connection part having an outwardly and substantially laterally extending pin inserted, at a distal side, into the first inner cylinder; and a vibration damper connected to at least one of said insulator and said pin at a side distal from the power unit, wherein the vibration damper is disposed beyond, relative to the power unit and the insulator, a connection point of the insulator to the vehicle body, and wherein the insulator is oriented in a direction substantially perpendicular to the direction of extension of the pin connecting the power unit and the insulator.

2. A vibration reducing system as claimed in claim 1, wherein said vibration damper has a second inner cylinder which is coaxial to said pin, a second elastic member which is connected to an outer surface of said second inner cylinder, a second outer cylinder which is connected to an outer surface of said second elastic member, and a mass which is connected to an outer surface of said second outer cylinder.

3. A vibration reducing system as claimed in claim 2, wherein said vibration damper is connected to said pin by a securing device.

4. A vibration reducing system as claimed in claim 3, wherein said securing device comprises a bolt and a threaded hole formed in a center of the pin.

5. A vibration reducing system as claimed in claim 4, wherein said vibration damper further comprises a boss which is fitted to an inner surface of said second inner cylinder, and the vibration damper is connected to the pin by securing the bolt to the threaded hole of the pin via a through hole which is formed at a center of the boss.

6. A vibration reducing system as claimed in claim 4, wherein said second inner cylinder has a securing part which is formed at one end of the second inner cylinder, and the vibration damper is connected to the pin by securing the bolt to the threaded hole of the pin via a through hole which is formed at a center of the securing part.

7. A vibration reducing system as claimed in claim 2, wherein said second inner cylinder has a fitting part, said vibration damper is connected to said first inner cylinder by connection of said fitting part to the first inner cylinder.

8. A vibration reducing system as claimed in claim 7, wherein said fitting part is formed by a cylindrical column which is fitted to an inner surface of the second inner cylinder at one end thereof, and said vibration damper is connected to said first inner cylinder by fitting the other end of said cylindrical column into an inner surface of the first inner cylinder.

9. A vibration reducing system as claimed in claim 7, wherein said second inner cylinder has a bottom plate which is formed at the other end of the second inner cylinder, said fitting part is formed by said bottom plate and the inner surface of the second inner cylinder, and said vibration damper is connected to said first inner cylinder by fitting an inner surface of said fitting part on an outer surface of the first inner cylinder.

10. A vibration reducing system as claimed in claim 1, further comprising a rotation preventing device which prevents relative rotation between the insulator and the vibration damper.

11. A vibration reducing system as claimed in claim 10, wherein said rotation preventing device couples a projection and a pit which is formed at surfaces of the insulator and the vibration damper.

12. A vibration reducing system for an automotive vehicle having a power unit, comprising:

a vibration insulator connected to a vehicle body;

a rigid connection member extending substantially laterally from the power unit and interconnecting the power unit and the vibration insulator; and a vibration damper connected to said rigid connection member opposite to the power unit and adjacent a side of said vibration insulator which is distal from the power unit and located in a position where the amplitude of the vibration produced by the power unit tends to maximize, and wherein the vibration insulator is oriented in a direction substantially perpendicular to the direction of the rigid connection member interconnecting the power unit and the vibration insulator.

13. A vibration reducing system as claimed in claim 12, wherein said vibration damper comprises at least one of a mass damper and a dynamic damper.

14. A vibration reducing system for automotive vehicles comprising:

insulator means for insulating a vibration which is generated by the power unit and is transmitted to the vehicle body, having a first inner cylinder, a first elastic member which is connected to an outer surface of said first inner cylinder, and a first outer cylinder which is connected to an outer surface of said first elastic member, and being connected to the vehicle body;

connecting means extending substantially laterally from the power unit for connecting said insulator means to the power unit; and damper means for damping the vibration connected to said insulator means at a side distal from the power unit, wherein the damper means is disposed beyond, relative to the power unit and the insulator, a connection point of the insulator to the vehicle body, and wherein the insulator means is oriented in a direction substantially perpendicular to the direction of extension of the connecting means connecting the power unit and the insulator means.

15. A vibration reducing system for vehicles, comprising:

an attachment part connected to a vehicle engine, the attachment part including a pin having a proximal side connected to the attachment part and a distal side extending substantially laterally away from the engine;

an insulator comprising an inner cylinder, an outer cylinder, an elastic member disposed therebetween, the outer cylinder including a mounting device for mounting the insulator to a vehicle body at a first connection point and the inner cylinder substantially coaxially receiving said distal side of the attachment part pin, the distal side of the pin extending at least partially through the inner cylinder;

a vibration damper comprising a damping mass and connected, at a second connection point, to at least one of the insulator and said distal side of said pin, wherein the damping mass of the vibration damper is substantially disposed beyond both said second connection point and said first connection point, relative to the engine, and wherein the insulator is oriented in a direction substantially perpendicular to the direction of extension of the pin connecting the power unit and the insulator.

\* \* \* \* \*